US012577162B2

(12) United States Patent
Gajski et al.

(10) Patent No.: US 12,577,162 B2
(45) Date of Patent: Mar. 17, 2026

(54) CONSTRUCTION MATERIAL BASED ON A MINERAL BINDER COMPRISING SYNERGISTICALLY EFFECTIVE HYDROPHOBISATION AGENT COMBINATIONS

(71) Applicant: Knauf Gips KG, Iphofen (DE)

(72) Inventors: Jakub Gajski, Belchatôw (PL); Agnieszka Bogobowicz, Aleksandrów (PL); Katarzyna Foltynska, Rusiec (PL)

(73) Assignee: Knauf Gips KG, Iphofen (DE)

( * ) Notice: Subject to any disclaimer, the term of this patent is extended or adjusted under 35 U.S.C. 154(b) by 365 days.

(21) Appl. No.: 18/038,116

(22) PCT Filed: Nov. 24, 2020

(86) PCT No.: PCT/EP2020/000202

§ 371 (c)(1),
(2) Date: May 22, 2023

(87) PCT Pub. No.: WO2022/111783

PCT Pub. Date: Jun. 2, 2022

(65) Prior Publication Data

US 2023/0365467 A1      Nov. 16, 2023

(51) Int. Cl.
| | |
|---|---|
| *C04B 28/14* | (2006.01) |
| *C04B 11/30* | (2006.01) |
| *C04B 22/06* | (2006.01) |
| *C04B 24/08* | (2006.01) |
| *C04B 24/42* | (2006.01) |
| *C04B 103/00* | (2006.01) |

(52) U.S. Cl.
CPC .............. *C04B 28/14* (2013.01); *C04B 11/30* (2013.01); *C04B 22/064* (2013.01); *C04B 22/066* (2013.01); *C04B 24/08* (2013.01); *C04B 24/42* (2013.01); *C04B 2103/0004* (2013.01)

(58) Field of Classification Search
CPC ....... C04B 28/14; C04B 11/30; C04B 22/064; C04B 22/066; C04B 24/08; C04B 24/42; C04B 2103/0004; C04B 28/16; C04B 40/0042; C04B 28/02; C04B 2111/27; C04B 28/145; C04B 14/06; C04B 14/185; C04B 22/16; C04B 24/38; C04B 24/383; C04B 2103/12; C04B 7/02; C04B 22/06
See application file for complete search history.

(56) References Cited

U.S. PATENT DOCUMENTS

| | | | |
|---|---|---|---|
| 4,129,447 A | 12/1978 | Roth et al. | |
| 5,626,668 A | 5/1997 | Gerhardinger et al. | |
| 5,702,828 A | 12/1997 | Adler et al. | |
| 2006/0054056 A1* | 3/2006 | Jungk ..................... C04B 18/02 106/38 |
| 2014/0069301 A1 | 3/2014 | Stepp et al. | |
| 2014/0121303 A1* | 5/2014 | Hagen ..................... C04B 28/16 524/5 |
| 2024/0010557 A1 | 1/2024 | Dostal et al. | |

FOREIGN PATENT DOCUMENTS

| | | | | |
|---|---|---|---|---|
| AU | 2010241328 A1 * | 12/2010 | ......... C04B 40/0039 |
| DE | 19506398 A1 | 8/1996 | |
| EP | 1698602 A1 | 9/2006 | |
| JP | S5298732 | 2/1976 | |
| JP | S8290954 A | 4/1996 | |
| JP | H08290954 A | 11/1996 | |
| JP | 2016507445 A | 3/2016 | |
| KZ | 34963 C1 | 3/2021 | |
| RU | 2440314 C1 | 1/2012 | |
| WO | 2004103928 A1 | 12/2004 | |
| WO | 2012159874 A1 | 11/2012 | |
| WO | 2015155034 A1 | 10/2015 | |
| WO | 2016139131 A1 | 9/2016 | |

OTHER PUBLICATIONS

Fang (CN 104016623A) (2014) (machine translation) (Year: 2014).*
CN 106186792A (2016) machine translation (Year: 2016).*
Sverak Tomas Petruj et al CS 241640B1 (1986) machine translation (Year: 1986).*
JP 2007001833A (Horai Kazuhiro et al) machine translation (Year: 2007).*
JPH06144907A Kadota Ysuhiro et al (1994) (Year: 1994).*
Misnikov, "The hydrophobic modification of gypsum binder by peat products: physico-chemical and technological pasis," Mires and Peat, vol. 21 (2018), pp. 1-14.

* cited by examiner

*Primary Examiner* — Pamela H Weiss
(74) *Attorney, Agent, or Firm* — The Webb Law Firm

(57) ABSTRACT

The invention concerns construction materials based on a mineral binder, which include a synergistically effective hydrophobisation mixture. The invention also relates to methods for processing of such construction materials and the use of a synergistically effective mixture for the hydrophobisation of a mineral binder based construction material.

5 Claims, No Drawings

CONSTRUCTION MATERIAL BASED ON A MINERAL BINDER COMPRISING SYNERGISTICALLY EFFECTIVE HYDROPHOBISATION AGENT COMBINATIONS

CROSS-REFERENCE TO RELATED APPLICATION

This application is the United States national phase of International Application No. PCT/EP2020/000202 filed Nov. 24, 2020, the disclosure of which is hereby incorporated by reference in its entirety.

BACKGROUND OF THE INVENTION

Field of the Invention

The invention concerns construction materials based on a mineral binder, which comprise a synergistically effective hydrophobisation mixture. The invention also relates to methods for processing of such construction materials and the use of a synergistically effective mixture for the hydrophobisation of a mineral binder based construction material.

Description of Related Art

Construction materials based on mineral binders such as those made of clays, cements and plasters are extremely common worldwide. Gypsum, in particular in the form of hydraulically setting calcium sulfate such as α- and β-hemihydrate or in the form of anhydrite I, II or III, is a very common building raw material, which is applied in a plurality of different formulations and for different applications, such as for instance gypsum plasterboards in drywall installations, in plastering for indoor use, in tile adhesives, in the flooring area, as well as in the handyman or do-it-yourself segment.

Many construction materials based on mineral binders are very sensitive to fluids in that they absorb water and other liquids readily. Particularly calcium sulfate (i.e. gypsum) building materials are extremely sensitive to water, which has prevented their frequent use in exterior applications or applications in moisture-prone rooms with increased atmospheric moisture such as wet units or bathrooms. To overcome this problem, many efforts have been made to formulate construction materials based on mineral binders in a way that the products are more hydrophobic or are provided with a hydrophobic coating to thus reduce water absorption and/or increase the water resistance.

To meet these standing demands, various technologies have been described which use liquid silicon-based compounds, such as for instance silanes, siloxanes, alkoxysilanes and/or organosilanes, as hydrophobizing components in order to obtain an increased water resistance, wherein use can be made of a catalyst and/or which can be processed at acidic or alkaline pH.

For instance, EP 1 698 602 A1 describes a gypsum mixture with improved mechanical and hydrophobic properties, which contains a uniformly dispersed additive consisting of at least one alkoxysilane and/or alkoxy-functionalized polysilane and at least one salt of mineral acids and metals of subgroups IIIB to VIII, IB or IIB, where the metal salts do not catalyze the silanol condensation to any noticeable extent. For the preparation of the gypsum mixture, the silane component and the metal salt are first mixed with water and subsequently a gypsum paste is prepared by introducing a commercially available builder's gypsum into the aqueous mixtures.

Whereas thus, silicone additives provide the desired effect of hydrophobisation, one downside of their use is often the relatively high content of the silicone additives, which is required to provide a desired degree of hydrophobisation. Due to the comparatively high price and the large quantities required in building materials, this is a significant cost factor.

Another class of hydrophobisation agents that is frequently used with gypsum containing construction materials are salts of fatty acids, whose water-repellent effect is based on its amphiphilic molecular character: The compounds consist of a hydrophobic, non-polar hydrocarbon moiety and a hydrophilic, polar end group (metal cation). When such hydrophobisation agents are dispersed in water, the polar hydrophilic head of the molecule is attracted to the charged surface of the mineral and adsorbs itself thereto, while the nonpolar hydrophobic tail of the molecule protrudes outwards and repels water. Thus, a well-adherent and moisture-repellent protective layer is formed.

While fatty acids are a more abundant and less costly hydrophobisation material, they do not provide the same hydrophobisation at a comparable content in the gypsum compositions relative to silicon-based hydrophobisation agents and there are concerns that higher contents of fatty acid hydrophobisation agents can have an unfavourable impact on the processing and/or mechanical properties of the resulting gypsum compositions.

Other hydrophobisation agents, which have been suggested for gypsum compositions, include peat products (see e.g. Misnikov O. "The hydrophobic modification of gypsum binder by peat products: physico-chemical and technological basis" Mires and Peat, Volume 21 (2018), pp. 1-14), as well as mixtures of water redispersible dispersion powders and thixotropic additives as described in DE 195 06 398 A1.

Based on this state of the art, there is a need for hydrophobisation agents, which are particularly suitable for the modification of construction materials based on mineral binders, which can be used at comparatively low additive concentrations to avoid the alteration of mechanical characteristics of the product, but which on the other hand provide a high hydrophobisation effect at low cost. The present application addresses these needs.

SUMMARY OF THE INVENTION

Surprisingly, in the investigations underlying this invention, it has been found that a combination of silicon-based hydrophobisation agents and fatty acid salt-based hydrophobisation agents provides a synergistic interaction of the two hydrophobisation agents. Also, a combination of a silicon-based hydrophobisation agent with a hydroxide providing salt or compound provides a synergistic hydrophobisation interaction. Construction materials that are based on a mineral binder show a remarkably reduced water uptake, when part of the silicon-based hydrophobisation agent is replaced by the fatty acid salt-based hydrophobisation agent. Similarly, these construction materials show a remarkably reduced water uptake, when a hydroxide providing salt or compound is present in the construction material. Particularly, the water uptake of a surface of these construction materials is reduced. A mixture of hydrophobisation agent/s, mineral binder and optional additives can be formed predominantly or even completely from solid constituents, so that it is possible to provide e.g. a render or plaster in solid form to the building site, where the material can be processed simply by the addition of the required amount of water without complex dosing of hydrophobisation agents thereto. Similarly, a mixture of hydrophobisation agents, mineral binder, optional additives and water can be blended into e.g. a slurry and subsequently be formed into building boards.

Accordingly, in a first aspect, the invention provides a construction material based on a mineral binder comprising a mineral binder and a synergistically effective mixture of a silicon-based hydrophobisation agent and a fatty acid salt-based hydrophobisation agent or corresponding precursors of the fatty acid salt-based hydrophobisation agent.

Mineral binders according to the invention comprise all particulate building materials that can physically or preferably chemically set when the mineral binder in dry/powder form is mixed with a fluid, for example water. Chemical setting involves a chemical reaction (e.g. hydration), while physical setting can be e.g. drying. Mineral binders can be calcium sulfate comprising binders as for example gypsum and also its partially dehydrated forms, i.e. $\alpha$- or $\beta$-hemihydrate (stucco) or anhydrite. Mineral binders can also be or comprise lime, clay or cement binders (such as e.g. Portland cement, Portland cement blends, other kiln cements, calcium aluminates or sulfoaluminates, magnesia cement, magnesium oxychroide cement, belite cement) as well as combinations thereof. Mineral binders can be hydraulic binders (such as e.g. cement, pozzolans, hydraulic lime, calcium sulfate hemihydrate or anhydrite, calcium silicates, clinker, fly ash) or non-hydraulic binders (such as clay, non-hydraulic lime, waterglass). Hydraulic binders set by hydration, while non-hydraulic binders need exposure to e.g. carbon dioxide for hardening. Construction materials based on mineral binders can additionally comprise various additives that are known to a person skilled in the art, e.g. fillers, accelerators, retarders, rheology modifying agents, hydrophobisation agents, refractory materials, etc. Aside from setting, the method for the preparation of a mineral binder based construction material can additionally comprise a drying step.

In the case of a calcium sulfate as a mineral binder, the dehydrated forms ($\alpha$- and $\beta$-hemihydrate and anhydrite) are re-hydrated in the presence of water. In this setting process, calcium sulfate dihydrate (i.e. gypsum) is formed. Calcium sulfate dihydrate crystals interlock and thus provide strength, while excess water still needs to evaporate for the complete hardening of the material.

The term "construction material based on a mineral binder" in this invention encompasses processable/formable mixtures comprising a mineral binder as well as set/solidified mixtures comprising a mineral binder. Set/solidified mixtures encompass the shaped bodies such as a building board (e.g. plasterboard or cement board), a brick, an installed render (e.g. an installed plaster), an installed mortar, an installed filler, an installed joint compound or an installed screed. Processable/formable mixtures encompass the not yet shaped bodies (i.e. powdered mixtures) such as render (e.g. a plaster), mortar, filler, joint compound or screed.

In this construction material the term "synergistically effective mixture" is intended to denote that the mixture provides a better hydrophobisation performance (in terms of e.g. a lower average total absorptivity for water, as determined according to EN 520:2004 5.9.2) than would be expected for that mixture based on the respective performance of only either of the components (where the compositions of the construction material are identical except for the components of the synergistically effective mixture). That is, for example if, in the case of the synergistically effective mixture of hydrophobisation agents, the silicon-based hydrophobisation agent at a concentration of 0.5 wt.-% based on the weight of the construction material provides an average total absorptivity of 5% in a composition and the fatty acid salt-based hydrophobisation agent at a concentration of 0.5 wt.-% provides an average total absorptivity of 15% in this composition, a combination of the two in a 1:1 mixture (at total 0.5 wt.-% hydrophobisation agent) would be expected to provide an average total absorptivity of 10%. The average total absorptivity of a synergistically effective mixture would be less than 10%.

Construction materials based on a mineral binder generally encompass a mix of materials and can thus have chemically diverse surfaces as well as chemically diverse voids (e.g. capillary pores or larger non-capillary pores). There can be different types of functional groups, ions or defects present, which can have different affinities towards hydrophobisation agents. Without wanting to be bound by theory, it is believed that the synergistically effective mixture takes advantage of the non-uniform chemical structure of the construction material, particularly of the non-uniform chemical structure of its voids, because it addresses the mentioned different affinities.

Typically, the hydrophobising agents according to the invention will be a powder or particulate composition. Precursors of the fatty acid salt-based hydrophobisation agent, i.e. fatty acids or esters thereof, can be in the form of fats, free fatty acids or an emulsion of one or both forms.

The term "fatty acid salt-based hydrophobisation agent or precursors of a fatty acid salt-based hydrophobisation agent" is intended to mean that this hydrophobisation agent is either a fatty acid salt or a fatty acid or ester thereof. The fatty acid or ester thereof can precipitate as a fatty acid salt in the presence of mono-, di- or trivalent cations and/or respective cation providing alkaline salts or compounds. The cation providing salt or compound can already be present in the construction material mixture or added solely for this purpose. The cations that are necessary for forming a salt with the fatty acid or ester thereof can be present in solution or on a mineral phase surface. Suitable cations can preferably be selected from $Na^+$, $NH^+$, $Ca^{2+}$, $Mg^{2+}$, $Zn^{2+}$, $Fe^{2+}$, $Fe^{3+}$, and/or $Al^{3+}$, suitable salts or compounds can preferably comprise cations selected from $Na^+$, $NH^+$, $Ca^{2+}$, $Mg^{2+}$, $Zn^{2+}$, $Fe^{2+}$, $Fe^{3+}$ and/or $Al^{3+}$.

The term mono-, di- or trivalent in connection with the cation of a salt is intended to denote a cation with one, two or three positive charges, respectively, where a cation is deemed as being "charged" if the atom thereof has a lower electronegativity than the atom, which is attached thereto.

As concerns the silicon-based hydrophobisation agent, the invention is not subject to any relevant restrictions, i.e. the silicon-based hydrophobisation agent can be in any form that has been previously described in the prior art for silicon-based hydrophobisation agents in connection with structures comprising inorganic mineral binders. Particularly suitable silicon-based hydrophobisation agents include silanes, siloxanes including silsesquioxanes, and/or silicones.

Of the silanes, alkoxysilanes are preferred. Particularly effective silanes for use as a hydrophobisation agent can be silanes with the general structure $R^1Si(OR^2)_3$ and/or $(R^1)_2$ $Si(OR^2)_2$, wherein the respective $R^1$ and $R^2$ may be same or different, whereof $R^1Si(OR^2)_3$ is preferred. Even more preferably, $R^1$ is a $C_1$ to $C_6$, most preferably a $C_1$ to $C_4$-alkyl and $R^2$ is independently from each other a $C_1$ to $C_3$ alkyl optionally comprising one or more hydroxyl groups, or a condensation product thereof. In this regard, it is noted that for silanes of this type it has been observed that a shorter carbon chain as the $R^1$ provides a better hydrophobisation effect compared to longer chains, so that alkyls such as propyl (n- and iso), ethyl and methyl are especially preferred as $R^1$; methyl is most preferred.

As in the course of providing the hydrophobisation effect, the $OR^2$ groups are hydrolysed to SiOH, the $R^2$ group is less critical to the performance of the silane as a hydrohobisation agent. Nonetheless, to provide a good stability of the hydrolysation alcohol ($HOR^2$) in water, the alcohol should be sufficiently hydrophilic. Particularly suitable residues $R^2$ are methyl, ethyl and moieties derived from glycols such as hydroxyethyl, 2- or 3-hydroxypropyl and 2,3-dihydroxypropyl.

An especially preferred hydrophobisation agent on the basis of a silane is propyltrimethoxysilane. Another especially preferred hydrophobisation agent on the basis of a silane is a methylsilane wherein OR2 is ethylenglycol which may be present as $OCH_2CH_2OH$ or may form a bridge between two Si atoms (as $Si—OCH_2CH_2O—Si$).

As is evident to the skilled practitioner, partial condensation products of the above indicated silanes can be siloxanes (i.e. compounds comprising silicon with oxgygen bridges, i.e. Si—O—Si linkages, preferably with one, two, three or four oxygen bridges). A particularly suitable group of silicon-based hydrophobisation agents are alkyl- and in particular methylsiloxanes or corresponding silsesquioxanes.

Another type of suitable silicon-based hydrophobisation agents are silicones, which in the context of this invention include both silicones having alkyl groups and hydrogens attached to the silicone. A particularly suitable silicone having attached hydrogens is a polymethylhydrogensiloxane, which preferably has terminal trimethylsiloxy groups.

The silicon-based hydrophobisation agent may comprise only a silicon compound, but may also comprise silicon compounds which are coated on a carrier material and which may be formulated with dispersion aids, if used in a dry form. It is noted that solvents of e.g. a dispersion of the hydrophobisation agent are not taken into account when the weight of the hydrophobisation agent is calculated for the purposes of this invention.

For this invention, commercially available silicon-based hydrophobisation agents e.g. those of the Silres series by Wacker Chemie AG, in particular Silres Powder E are especially preferred. Other preferred commercially available silicon-based hydrophobisation agents are those of the DOWSIL™ series including in particular DOWSIL™ GP SHP 50 by Dow Chemical.

The content of the silicon-based hydrophobisation agent is regularly in the range of 0.01 to 4.99 wt.-%, preferably in the range of 0.02 to 0.98 wt.-% and most preferably in the range of 0.1 to 0.7 wt.-% based on the dry weight of the construction material.

The fatty acid salt-based hydrophobisation agent is also not subject to any significant restrictions. The respective fatty acids, which form the fatty acid salt-based hydrophobisation agent, can be saturated or unsaturated. Preferably, the fatty acid in the fatty acid salt hydrophobisation agent is a $C_4$ to $C_{30}$ fatty acid, more preferably $C_8$ to $C_{24}$ fatty acid, and even more preferably $C_{12}$ to $C_{22}$ fatty acid, or a mixtures of such acids.

Exemplary suitable unsaturated fatty acids include palmitoleic acid, vaccenic acid, icosenoic acid, cetoleic acid, linoleic acid, linolenic acid and oleic acid, wherefrom oleic acid is especially preferred. Exemplary suitable saturated fatty acids include lauric acid, myristic acid, pentadecanoic acid, palmitic acid, margaric acid, nonadecanoic acid, arachidic acid, behenic acid, lignoceric acid, cerotic acid, montanic acid, melissic acid and stearic acid, wherefrom stearic acid is especially preferred.

As noted above, the fatty acid salt-based hydrophobisation agent is not necessarily used as a fatty acid directly, but can be used as a salt thereof with a mono-, di- or trivalent cation. Particularly suitable mono-, di- or trivalent cations for the fatty acid salt-based hydrophobisation agent comprise $Na^+$, $NH^+$, $Ca^{2+}$, $Mg^{2+}$, $Zn^{2+}$, $Fe^{2+}$, $Fe^{3+}$ and/or $Al^{3+}$. In a particular preferred embodiment of the present invention, the mono- or divalent cation of the fatty acid salt-based hydrophobisation agent (i.e. of the soap) is $Na^+$ and/or $Ca^{2+}$. The fatty acid salt-based hydrophobisation agent can comprise salts of unsaturated fatty acids, such as e.g. linoleates, linoleneates, oleates, recinoleates, and/or salts of saturated fatty acids, such as e.g. laurates, myrestates, palmitates, stearates, and/or also naphthenates, resinates or tallates. In an especially preferred embodiment of the present invention, the fatty acid salt-based hydrophobisation agent comprises a sodium oleate and/or calcium stearate.

In one preferred embodiment, the inventive construction material comprises an unsaturated fatty acid salt-based hydrophobisation agent, a saturated fatty acid salt-based hydrophobisation agent and a silicon-based hydrophobisation agent. Preferably, in such construction material the ratio of unsaturated fatty acid to saturated fatty acids is from about 3:1 to 1:3, more preferably about 2:1 to 1:2 and even more preferably about 1:1.

As noted above, the inventive construction material can comprise precursors of the fatty acid salt-based hydrophobisation agent as a partial or full replacement of the fatty acid salt. In a preferred embodiment, the precursors of this hydrophobisation agent comprise a fatty acid or ester thereof. These precursors can combine with a cation providing salt or compound to form a fatty acid based hydrophobisation agent in situ. Also, a fatty acid salt-based hydrophobisation agent can exchange its cation. It, too, can thus combine with a cation providing salt or compound. The cation providing salt or compound can comprise a mono- di- or trivalent cation. Particularly suitable mono-, di- or trivalent cations comprise $Na^+$, $NH^+$, $Ca^{2+}$, $Mg^{2+}$, $Zn^{2+}$, $Fe^{2+}$, $Fe^{3+}$ and/or $Al^{3+}$. Alternatively or in addition thereto, salts or compounds, which can be suitable for supplying cations for the fatty acids or esters thereof, can be alkaline earth metal salts or compounds, aluminium hydroxide, zinc hydroxide, iron hydroxide or Portland cement. As mentioned above, these cation providing salts or compounds can also combine with a fatty acid salt-based hydrophobisation agent in exchange for an already present cation. Preferred alkaline earth metal salts or compounds are alkaline earth metal oxides (e.g. calcium oxide) and/or alkaline earth metal hydroxides (e.g. calcium hydroxide, magnesium hydroxide). A particularly preferred alkaline earth metal hydroxide for supplying cations to the precursors of the fatty acid salt hydrophobisation agent is a calcium hydroxide. Fatty acids generally have a higher affinity towards multivalent cations. If present, calcium cations are particularly preferred. This also means that a fatty acid salt-based hydrophobisation agent with a monovalent cation will readily exchange its monovalent cation for e.g. a calcium cation in situ.

The content of the fatty acid salt-based hydrophobisation agent is regularly in the range of 0.01 to 4.99 wt.-%, preferably in the range of 0.02 to 0.98 wt.-% and most preferably in the range of 0.1 to 0.7 wt.-% based on the dry weight of the construction material. Alternatively, or in addition thereto, the silicon-based hydrophobisation agent and the fatty acid salt-based hydrophobisation agent can be incorporated in a weight ratio of 0.5-5:1, preferably 0.5-2:1.

In addition, the total content of all hydrophobisation agents in the inventive construction material can comprise 0.02 to 5 wt.-%, preferably 0.04 to 1 wt.-% and more preferably 0.2 to 0.8 wt.-% based on the dry weight of the construction material. The total content of all hydrophobisation agents can refer to either the combined content of silicon-based and fatty acid salt-based hydrophobisation agents or only the silicon-based hydrophobisation agent, if no fatty acid salt-based hydrophobisation agent is present.

In the investigation underlying this invention, it has been found that the incorporation of a hydroxide providing salt or compound, preferably comprising a mono-, di- or trivalent cation, in an amount such that the hydroxide providing salt or compound is present in a weight ratio of 2:1 to 20:1 and preferably 5:1 to 16:1 relative to the combined weight of the silicon-based and fatty acid salt-based hydrophobisation agents can provide an enhancement of the hydrophobisation effect. More preferably, this salt or compound is an alkaline earth metal oxide or alkaline earth metal hydroxide, aluminium hydroxide, hydrated borate, hydrated phosphate, hydrated silicate, hydrated aluminosilicate, Portland cement or precipitated silica. If the hydroxide providing salt or compound is an alkaline earth metal oxide or hydroxide, it is generally preferred that it is present in excess over the amount required for a full conversion of a (reactive) fatty acid salt or precursor thereof to a respective alkaline earth metal fatty acid salt. Most preferably, the alkaline earth metal oxide or hydroxide is selected from active calcium oxide, calcium hydroxide or magnesium hydroxide. Oxides can provide hydroxide anions, because they can react to hydroxides in an aqueous solution. In an especially preferred embodiment, the hydroxide providing salt is a calcium hydroxide ($Ca(OH)_2$).

Alternatively, the construction material based on a mineral binder comprises a mineral binder and a synergistically effective mixture of a hydroxide providing salt or compound and a silicon-based hydrophobisation agent in a weight ratio of 2:1 to 20:1, preferably 5:1 to 16:1. Surprisingly, the combination of a hydroxide providing salt or compound with a silicon-based hydrophobisation agent provides a better hydrophobisation performance (in terms of e.g. a lower average total absorptivity for water, as determined according to EN 520:2004 5.9.2) than would be expected of the silicon-based hydrophobisation agent separately. Preferably, this construction material can further comprise a fatty acid salt-based hydrophobisation agent or precursors of a fatty acid salt-based hydrophobisation agent. Alternatively, or in addition thereto, the hydroxide providing salt or compound in the embodiment mentioned above can be an alkaline earth metal oxide or hydroxide, aluminium hydroxide, hydrated borate, hydrated phosphate, hydrated silicate, hydrated aluminosilicate, Portland cement or precipitated silica. Preferably, the alkaline earth metal oxide or hydroxide can be a calcium hydroxide, reactive calcium oxide or magnesium hydroxide. More preferably, the hydroxide providing salt is a calcium hydroxide ($Ca(OH)_2$). Any applicable combinations as well as preferred embodiments mentioned previously are deemed as being described for this alternative.

As concerns the mineral binder, which forms the basis of the inventive construction material, the invention is not subject to significant restrictions and it is possible to use any conventional binder, which is known to the person skilled in the art. Preferred mineral binders for use in the invention are hydraulic binders. Preferably, the hydraulic binders comprise a calcium sulfate based binder and/or a cement binder, most preferably the calcium sulfate based binder comprises more than 60 wt.-%, preferably more than 80 wt.-%, more preferably more than 95 wt.-% calcium sulfate based on the total weight of the mineral binder. If the mineral binder is based on calcium sulfate, the processable/formable mixture will comprise α- and/or β-hemihydrate and/or anhydrite, whereas the set/solidified mixture will comprise >90% calcium sulfate dihydrate (i.e. gypsum) based on the total amount of calcium sulfate.

Depending on the composition, the construction material may comprise the mineral binder in a relatively broad scope of contents such as 10 to 98 wt.-% of the total weight of the construction material. In one embodiment, the content of the mineral binder in the construction material is in the range of 10 to 50 wt.-% and in particular 15 to 40 wt.-%. In another embodiment, the content of the mineral binder in the construction material is in the range of 60 to 98 wt.-% and in particular 70 to 95 wt.-%.

Next to the essential ingredients as described above, the inventive construction material can comprise further additives to adjust or optimize one or more mechanical or processing characteristics thereof. Such additives include, while not being limited thereto, retention modifiers, rheology modifiers, fillers, setting regulators, pigments, dyes, fluxing agents, fibres (e.g. made of cellulose or synthetic material or inorganic fibres), dispersion powders, adhesion-promoting additives, thixotropic agents, antioxidants, resins, processing agents or elasticity-imparting additives.

Possible fillers include e.g. rock flour or mineral flour such as limestone filler, sand, such as quartz sand, in particular with a size of <2 mm, split, calcium sulfate dihydrate flour, perlite, vermiculite and zeolite. Depending on the content of the other ingredients and the intended use, fillers can be used in contents of up to approx. 90 wt.-% (i.e. up to 88.98 wt.-%) of the composition.

Possible water retention or rheology modifiers include etherified polysaccharides, such as methyl cellulose or methyl 2-hydroxyethyl cellulose, polyglycols, polyacrylamides, natural clays and chemically modified clays. Such agents will regularly be used in amounts of up to a total of 1 wt.-% and preferably up to 0.5 wt.-% of the construction material.

Possible setting time regulators include e.g. inorganic acids or their salts, phosphates, amino acids, degraded polyamide, e.g. salified with calcium, sugar including sugar acid salts such as sodium gluconate, sulfates of Na, K, ammonium and Al, or micronized calcium sulfate dihydrate. Setting time regulators will regularly be used in amounts of up to a total of 1 wt.-% and preferably up to 0.5 wt.-% based on the dry weight of the construction material.

A typical composition for an inventive construction material comprising calcium sulfate as a mineral binder (where all ingredient contents are given on a dry basis based on the total dry weight of the construction material) can be:

10 to 98 wt.-% and preferably 20 to 80 wt.-% of calcium sulfate binder, i.e. calcium sulfate anhydrite and/or alpha/beta calcium sulfate hemihydrate;

1 to 15 wt.-% and preferably 2 to 10 wt.-% of calcium hydroxide (or e.g. reactive calcium oxide, magnesium hydroxide, aluminium hydroxide, hydrated borate, hydrated phosphate, hydrated silicate, hydrated aluminosilicate, Portland cement or precipitated silica);

0.01 to 4.99 wt.-%, preferably 0.02 to 0.98 wt.-%, fatty acid salt-based hydrophobisation agent and 0.01 to 4.99 wt.-%, more preferably 0.02 to 0.98 wt.-%, silicon-based hydrophobisation agent, wherein the total amount of hydrophobisation agent is in the range of 0.02 to 5 wt.-%;

up to 1 wt.-% of water retention or rheology modifiers (e.g. etherified polysaccharides, polyglycols, polyacrylamides, natural clays, chemically modified clays);

up to 88.98 wt.-% of inorganic fillers (e.g. quartz or limestone sands, quartz or limestone flour, gypsum flour, perlite, vermiculite, zeolite);

up to 1 wt.-% of setting regulators (i.e. retarders and accelerators, e.g. organic acids or their salts, phosphates, amino acids, sugars, $Na^+/K^+/NH_4^+/Al^{3+}$ sulfates, micronized calcium sulfate dihydrate).

The inventive construction material can be prepared comprising the steps:

(i) mixing water with a mineral binder and a synergistically effective mixture of a silicon-based hydrophobisation agent and a fatty acid salt-based hydrophobisation agent or corresponding precursors thereof, and optionally additional additives (ii) shaping the construction material and (iii) allowing the construction material to set.

Alternatively, the inventive construction material can be prepared comprising the steps:

(i) mixing water with a mineral binder and a synergistically effective mixture of a hydroxide providing salt or compound and a silicon-based hydrophobisation agent in a ratio of 2:1 to 20:1 and optionally additional additives;

(ii) shaping the construction material, and (iii) allowing the construction material to set.

In the method described above, the synergistically effective mixture in step (i) can further comprise a fatty acid salt-based hydrophobisation agent or precursors of a fatty acid salt-based hydrophobisation agent.

The construction material prepared according the described methods can be a board or a render or a screed.

In a yet further aspect, the inventive construction material can have an average total absorptivity measured according to EN520:2004, 5.9.2 of 10% or less, preferably 4% or less and more preferably 3.5% or less.

In a yet further aspect, the invention concerns the use of a synergistically effective mixture of a silicon-based hydrophobisation agent and a fatty acid salt-based hydrophobisation agent precursors of a fatty acid salt-based hydrophobisation agent for the hydrophobisation of a construction material based on a mineral binder to achieve an average total absorptivity measured according to EN520:2004, 5.9.2 of 10% or less and preferably 4% or less.

Alternatively, the invention concerns the use of synergistically effective mixture of a silicon-based hydrophobisation and a hydroxide providing salt or compound for the hydrophobisation of a construction material based on a mineral binder to achieve an average total absorptivity measured according to EN520:2004, 5.9.2 of 10% or less and preferably 4% or less.

Any above described embodiments and alternatives are deemed as being described also in combination thereof, even though the combination may not be explicitly mentioned, provided that the alternatives or embodiments are not in clear contradiction to each other.

DESCRIPTION OF THE INVENTION

In the following, the invention will be illustrated further by means of examples, which must however not be construed has having any limiting implications on the invention.

EXAMPLES

A plaster composition was formulated from calcium sulfate hemihydrate as mineral binder, rheology modifiers, setting regulators and fillers by addition of an appropriate amount of water to provide the required fluidity. An exemplary composition for Sample 6 is given in Table 1.

TABLE 1

| Components | Amount [kg] |
|---|---|
| Calcium sulfate hemihydrate | 530 |
| Calcium hydroxide | 50 |
| Filler comprising fine limestone <0.1 mm, quartz sand <0.8 mm) | 398.6 |
| Cellulose thickener | 2.5 |
| Accelerators | 0.2 |
| Starch based rheology modifiers | 0.6 |
| Retarders comprising phosphate based retarders and organic based retarders. | 2.1 |
| Silicon-based hydrophobisation agent (Silres Powder E) | 3 |
| Fatty acid salt-based hydrophobisation agent (Bearophob ECO) | 2 |
| Perlite | 11 |
| Total | 1000 |

Aside from the hydrophobisation agents and the calcium hydroxide, all other samples have an identical composition to the composition of Sample 6, which is shown in Table 1. This identical composition is summarized as "plaster composition" in the first column of Table 2. The only other exceptions are Samples 1 and 8, where the total amount of plaster composition differs. In both samples, the difference in the amount of the plaster composition is solely attributable to a difference in the amount of calcium sulfate hemihydrate. Table 2 focuses on the components that were varied: calcium hydroxide ($Ca(OH)_2$), the silicon-based hydrophobisation agent and the fatty acid salt-based hydrophobisation agent. More specifically, Baerophob ECO (a 1:1 mixture of sodium oleate and calcium stearate by Baerlocher GmbH) and Silres Powder E (a silane based hydrophobisation agent by Wacker Chemie AG) were used. All quantities are given in the respective parts by weight per 1000. The amount of the plaster composition, incl. the mineral binder, is given on a dry basis.

TABLE 2

| Plaster composition comprising mineral binder, filler, additives other than $Ca(OH)_2$ and hydrophobisation agents | $Ca(OH)_2$ | Si-based hydrophobisation agent | Fatty acid salt-based hydrophobisation agent |
|---|---|---|---|
| Sample 1* | 950 | 50 | 0 | 0 |
| Sample 2 | 945 | 50 | 5 | 0 |
| Sample 3* | 995 | 0 | 5 | 0 |
| Sample 4* | 945 | 50 | 0 | 5 |
| Sample 5 | 945 | 50 | 2 | 3 |
| Sample 6 | 945 | 50 | 3 | 2 |

TABLE 2-continued

| Plaster composition comprising mineral binder, filler, additives other than Ca(OH)$_2$ and hydro-phobisation agents | Ca(OH)$_2$ | Si-based hydro-phobisation agent | Fatty acid salt-based hydro-phobisation agent |
|---|---|---|---|
| Sample 7 | 945 | 50 | 4 | 1 |
| Sample 8 | 944 | 50 | 4 | 2 |

*Comparative samples

The thus prepared samples were shaped (i.e. in a cast or mold), allowed to set and dried to a constant weight. Subsequently, the average total absorptivity and, in the case of Sample 8, also the capillary absorptivity of the samples was determined.

For the determination of the average total absorptivity, 4×4×16 cm prisms of the set compositions were analyzed as described in EN 520:2004, 5.9.2.

For the determination of the capillary absorptivity, samples were assessed according to EN 1015-18:2002.

The results of these tests are provided in Table 3 below:

TABLE 3

| | Average total absorptivity [%] | Capillary absorptivity [kg/m$^2$min$^{0.5}$] |
|---|---|---|
| Sample 1* | 32.5 | — |
| Sample 2 | 3.7 | — |
| Sample 3* | 16.3 | — |
| Sample 4* | 34.8 | — |
| Sample 5 | 3.4 | — |
| Sample 6 | 3.7 | — |
| Sample 7 | 3.4 | — |
| Sample 8 | 2.5 | 0.2 |

*Comparative samples

As is apparent from Table 3, the samples comprising only one of the hydrophobisation agents (with the exception of Sample 2) provide only moderate hydrophobisation at a respective agent content of about 0.5 wt.-% based on the dry weight of the construction material. Interestingly, the sample comprising both calcium hydroxide and a silicon-based hydrophobisation agent (Sample 2) provided much lower absorptivity than Sample 3 with only the silicon-based hydrophobisation agent.

The performance of Samples 5 to 7 is about comparable or slightly better than for Sample 2 and significantly better than that of Sample 3 and 4, which only comprise one of the hydrophobisation agents. In Sample 8, where the combined hydrophobisation agent content was increased slightly from 0.5 to 0.6 wt.-%, the average absorptivity was reduced even further.

The invention claimed is:

1. A construction material based on a mineral binder comprising a mineral binder and a synergistically effective mixture of Ca(OH)$_2$, a silicon-based hydrophobisation agent and a fatty acid salt-based hydrophobisation agent, or precursors of a fatty acid salt-based hydrophobisation agent, wherein Ca(OH)$_2$ is present in a ratio of 2:1 to 20:1 relative to combined weight of said silicon-based hydrophobisation agent and said fatty acid salt-based hydrophobisation agent, and wherein the precursors of a fatty acid salt-based hydrophobisation agent is selected from fatty acid and esters thereof, wherein Ca(OH)$_2$ is present in an amount of 1 wt. % to 15 wt. %, based on total dry weight of said construction material, wherein said silicon-based hydrophobisation 13 as agent is present in an amount of 0.01 wt. % to 4.99 wt. %, based on total dry weight of said construction material, wherein said fatty acid salt-based hydrophobisation agent, or precursors of said fatty acid salt-based hydrophobisation agent, is present in an amount of 0.01 wt. % to 4.99 wt. %. based on total dry weight of said construction material, and wherein said construction material has a lower average total absorptivity for water as determined in accordance with EN 520:2004 5.9.2, as compared to a comparable construction material that is free of Ca(OH)$_2$, said silicon-based hydrophobisation agent, and said fatty acid salt-based hydrophobisation agent or precursors of said fatty acid salt-based hydrophobisation agent.

2. The construction material according to claim 1, wherein the fatty acid in the fatty acid salt-based hydrophobisation agent is a C$_4$ to C$_{30}$ fatty acid, preferably a C$_8$ to C$_{24}$ fatty acid and more preferably a C$_{12}$ to C$_{22}$ fatty acid, or a mixture of such acids.

3. The construction material according to claim 1, comprising a total content of 0.02 to 5 wt.-% and preferably 0.04 to 1 wt.-% of all hydrophobisation agents based on the dry weight of the construction material.

4. The construction material according to claim 1, wherein the mineral binder is a hydraulic binder, preferably the hydraulic binder comprises a calcium sulfate based binder and/or a cement binder, most preferably the calcium sulfate based binder comprises more than 60 wt.-% calcium sulfate based on the total weight of the mineral binder.

5. A method for the preparation of a construction material based on a mineral binder comprising the steps of:

(i) mixing water with a mineral binder and a synergistically effective mixture of Ca(OH)$_2$, a silicon-based hydrophobisation agent and a fatty acid salt-based hydrophobisation agent, or precursors of a fatty acid salt-based hydrophobisation agent and optionally additional additives;

(ii) shaping the construction material, and (iii) allowing the construction material to set, wherein Ca(OH)$_2$ is present in a ratio of 2:1 to 20:1 relative to combined weight of said silicon-based hydrophobisation agent and said fatty acid salt-based hydrophobisation agent, and wherein the precursors of a fatty acid salt-based hydrophobisation agent is selected from fatty acid and esters thereof, wherein Ca(OH)$_2$ is present in an amount of 1 wt. % to 15 wt. %, based on total dry weight of said construction material, wherein said silicon-based hydrophobisation agent is present in an amount of 0.01 wt. % to 4.99 wt. %, based on total dry weight of said construction material, wherein said fatty acid salt-based hydrophobisation agent, or precursors of said fatty acid salt-based hydrophobisation agent, is present in an amount of 0.01 wt. % to 4.99 wt. %, based on total dry weight of said construction material, and wherein said construction material has a lower average total absorptivity for water as determined in accordance with EN 520:2004 5.9.2, as compared to a comparable construction material that is free of Ca(OH)$_2$, said silicon-based hydrophobisation agent, and said fatty acid salt-based hydrophobisation agent or precursors of said fatty acid salt-based hydrophobisation agent.

* * * * *